United States Patent [19]

Fong

[11] Patent Number: 4,853,192

[45] Date of Patent: Aug. 1, 1989

[54] WATER REMOVAL IN A REDOX PROCESS

[75] Inventor: Howard L. Fong, Sugar Land, Tex.

[73] Assignee: Shell Oil Company, Houston, Tex.

[21] Appl. No.: 282,898

[22] Filed: Dec. 12, 1988

Related U.S. Application Data

[63] Continuation of Ser. No. 91,486, Aug. 31, 1987, abandoned.

[51] Int. Cl.$^4$ ............... C01B 17/16; C01B 31/20; C01B 17/02
[52] U.S. Cl. ............................ 423/226; 203/14; 423/576.5; 423/576.6
[58] Field of Search ................. 423/226, 576.6, 576.5; 203/14

[56] References Cited

U.S. PATENT DOCUMENTS

| | | | |
|---|---|---|---|
| 4,515,764 | 5/1985 | Diaz | 423/226 |
| 4,518,576 | 5/1985 | Diaz | 423/226 |
| 4,518,577 | 5/1985 | Klecka | 423/226 |
| 4,649,032 | 3/1987 | Snavely et al. | 423/226 |

Primary Examiner—John Doll
Assistant Examiner—Lori S. Freeman
Attorney, Agent, or Firm—Nancy Joyce Gracey

[57] ABSTRACT

Excess water is removed from regenerated redox solution by contacting a downwardly flowing spray of regenerated redox solution with a stream of inert gas at a rate and pressure sufficient to provide for the substantial saturation of the gas with excess water impurities in the redox solution without the substantial undesirable oxidation of the metal in the regenerated redox solution.

20 Claims, 1 Drawing Sheet

WATER REMOVAL IN A REDOX PROCESS

This is a continuation of application Ser. No. 091,486, filed Aug. 31, 1987. Now abandoned.

FIELD OF THE INVENTION

The present invention relates to a process for the removal of excess water in a redox process used to recover sulfur from hydrogen sulfide containing gas streams.

BACKGROUND OF THE INVENTION

In a redox process used to remove hydrogen sulfide from a gas stream and obtain elemental sulfur, water is formed as a by-product in the oxidation of hydrogen sulfide to elemental sulfur. Water can also enter the process in other ways, including by the water washing of the sulfur filter cake, pump seal leaks, and the like. In many application of the redox process, water removal is required to maintain the water balance of the process system. This is usually accomplished via a vacuum flash operation but that adds to the cost and complexity of the operation. Alternatively, using the feed gas to remove water by preheating the gas will only be practical for certain specific uses of the process. Water removal is also accomplished by using a large excess of air in the regenerator and using the regenerating air to strip out the water but this can over-oxidize the redox solution resulting in high ligand degradation in addition to the high cost of large amounts of compressed air.

SUMMARY OF THE INVENTION

The present invention is direct to a process for the selective removal of hydrogen sulfide from a gas stream which comprises (a) treating the gas stream with an aqueous polyvalent metal ion or polyvalent metal chelate redox solution containing a desired amount of polyvalent metal ion or chelate, and optionally containing a degradation inhibitor; (b) recovering a sweetened gas stream; (c) removing sulfur from the solution, (d) regenerating the solution with an excess of an oxygen containing gas, and (e) contacting the regenerated solution with an inert gas in a manner to provide for the substantial saturation of the inert gas with excess water impurities from the redox solution without substantial undesirable oxidation of the metal in the regenerated redox solution and (f) recycyling the regenerated redox solution having a polyvalent metal ion or chelate concentration substantially the same as the feed solution to step (a).

By use of the process of the present invention, the water balance in the redox process can be maintained in a simple manner without the need of preheater, stripper or expensive air compression equipment.

The invention also includes a process for the removal of excess water from a regenerated aqueous polyvalent metal ion or polyvalent metal chelate solution which comprises contacting a regenerated aqueous solution of polyvalent metal ion or polyvalent metal chelate solution containing water in excess of that required to maintain a desired molar concentration of polyvalent metal ion or chelate in the solution, and optionally containing a degradation inhibitor, with an inert gas in a manner to provide for the substantial saturation of the inert gas with the excess water impurities in the redox solution without substantial undesirable oxidation of the metal in the regenerated redox solution.

In the present invention, the contacting of the regenerated redox soluton containing the excess water with an inert gas can be conducted in a variety of ways such as (1) the use of a static mixing device in the feed line from the regenerator to a (surge/thickener) zone, or (2) passing the regenerated redox solution downwardly as a spray into a (surge/thickener) zone where it is contacted by a cross stream of inert gas which is injected at a point above the liquid level in the zone. Other equivalent systems can be used.

The inert gas used to remove excess water from the redox solution can be any non-$H_2S$ containing gas which will remove water without substantially oxidizing or contaminating the redox solution. The most convenient inert gas is air.

The pressure in the process to remove excess water from the redox solution is not critical. However, at ambient pressures, and especially about atmospheric pressure, more water is removed in an economically efficient manner than at substantially higher or lower pressures.

The temperature in the process to remove excess water from the redox solution is not critical but low temperatures will require the use of larger volumes of the inert gas. Preferably, the temperature is from about 90° F. to about 130° F.

In the process the rate of the inert gas flow, pressure and temperature used in the contacting of inert gas is sufficient to provide for the substantial saturation of the inert gas with the excess water from the redox solution without the substantial undesirable oxidation of the regenerated redox solution. The amount of moisture removed is determined by the approach to water saturation of the inert gas at a given temperature and pressure. The determination of such rates, temperatures and pressures are within the skill of the art and can vary from system to system but are readily determinable. For example, when using a static mixer to remove excess water in the amount of 2 lbs./min., at atmospheric pressure and 110° F., the amount of stripping pressure of the inert gas required is from about 800 SCFM to 1500 SCFM.

In the water removal process, the water removal zone can contain conventional devices which will reduce the possibility of entrainment of the redox solution in the inert gas, e.g., baffles, entrainment mats or the like, or the zone and equipment can be sized in a conventional manner which will reduce possible entrainment of the redox solution in the inert gas.

The temperatures employed in the $H_2S$ absorption zone are not generally critical, except that the reaction is carried out at a temperature below the melting point of sulfur. In many commercial applications, such as the removal of $H_2S$ from natural gas to meet pipeline specificatons, contacting at ambient temperatures is desired. In general, temperatures of from 10° C. to 80° C. are suitable, and temperatures from 20° C. to 45° C. are preferred. Contact times may range from about 0.5 second to about 270 seconds or longer, with contact times of 1 seconds to 120 being preferred Similarly, in the regeneration of stripping zone or zones, temperatures may be varied widely. Preferably, the regeneration zone should be maintained at substantially the same or, preferably a lower temperature than the absorption zone. In general, temperatures of from about 10° C. to 80° C., preferably 20° C. to 45° C., may be employed.

As used herein, the term "oxygen" in regard to the regeneration step includes oxygen containing gases, air or air enriched with oxygen. The oxygen oxidizes the reduced metal ions or the metal of the chelate or chelates to a higher valence state, and the regenerated mixture is returned to the contact zone. The oxygen (in whatever form supplied) is supplied in a stoichiometric equivalent or excess with respect to the amount of reactant present in the mixture. Preferably, the oxygen containing gas is supplied in an amount of from about 1.2 to 5 times the stoichiometric requirement.

In accord with this invention a solution of a polyvalent metal in chelate form is contacted with the hydrogen sulfide containing gas. The chelate solution, per se, does not constitute the present invention and may be selected from among the chelate solutions taught by the art to be useful in sulfur oxidation processes.

The metals which may be employed are those polyvalent metals which will oxidize hydrogen sulfide to sulfur and in turn be reoxidized by oxygen or similar gas.

Any polyvalent metal can be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin. The metals are normally supplied as a salt, oxide, hydroxide, etc.

The chelating agents or liquids which may be used in conjunction with polyvalent metallic cations are those which form a complex ion having enough stability in solution.

These materials include aminopolycarboxylic acid chelating agents of the alkylenediamine and phenylenediamine types, such as ethylenediamine tetraacetic acid, nitrilotriacetic acid, or the like. They may also contain ammonia or an aliphatic, alicyclic, or heterocyclic primary or secondary amine.

Specific, nonlimiting examples of aminopolycarboxylic acids include diglycine, hydroxyethyldiglycine, nitrilotriacetic acid, carboxylic acide derivatives of ethylenediamine, diethylene triamine, 1,2-propylenediamine, and 1,3-propylenediamine, such as ethylenediamine tetraetic acid (EDTA), 2-hydroxyethyl ethylenediamine triacetic acid (HEDTA), diethylenetriamine pentacetc acid (DETPA), and caryboxylic acid derivatives of cyclic 1,2-diamines such as 1,2-diaminocyclohexane-N, N-tetracetic acid, and 1,2-phenylenediamine-N,N-tetracetic acid. Salts of these acids, such as alkali metal salts, may also be used.

The amount of Fe(III) contacted with the $H_2S$-containing gas must be at least the amount required to react with the $H_2S$. It must be kept in mind that the dissolved iron is continuously being reoxidized to Fe(III) so that the amount of Fe(III) required is essentially a catalytic amount. The rate at which Fe(II) is oxidized to Fe(III) depends upon temperature, agitation, contact time and other factors. The total Fe(III) present as a combination of fed Fe(III) and Fe(II) generated by reoxidation should be at least the amount required to react with the sulfide and mercaptans and preferably is from about 150 to 300% of the amount required to react.

The system is usually run neutral to somewhat basic. This is controlled by adding caustic, such as KOH, NaOH or the like, in controlled amounts. It is preferred to maintain the pH at from about 6 to about 10, more preferably pH 7.0 to 8.5.

Preferred reactant materials are coordination complexes in which polyvalent metals form chelates with an acid having the formula $(X)_{3-n}-N-(Y)_n$ wherein n is a whole number from 1 to 3; Y is an acetic acid or propionic acid group; X is 2-hydroxy ethyl, 2-hydroxy propyl, or an alkyl group having from one to four carbon atoms, or

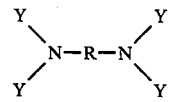

wherein: from two to four of the groups Y are selected from acetic and propionic acid groups; from zero to two of the groups Y are selected from 2-hydroxy ethyl and, 2-hydroxy propyl; and R is ethylene, propylene or isopropylene or alternatively cyclohexane or benzene where the two hydrogen atoms replaced by nitrogen are in the 1,2 position; and mixtures thereof.

The polyvalent metal chelates are readily formed in aqueous solution by reaction of an appropriate metal salt, oxide or hydroxide of the polyvalent metal and the chelating agent in the acid form or an alkali metal or ammonia salt thereof. Exemplary chelating agents include amino acetic derived from ammonia or 2-hydroxy alkyl amines, such as glycine, diglycine (imino diacetic acid), NTA (nitrilotri-acetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxyethylethylene diamine triacetic acid), DETPA (diethylene tramine pentaacetic acid); amino acetic acid derivatives of cyclic 1,2-diamines, such as 1,2-diamino cyclohexane-N,N-tetra-acetic acid, and 1,2-phenylene-diamine-N,N-tetraacetic acid, and the amides of polyamino acetic acids disclosed in Bersworth U.S. Pat. No. 3,580,950. The ion chelates of NTA and 2-hydroxyethyl ethylene diamine triacetic acid are preferred.

Pressure conditions in the contacting or absorption zone may vary widely, depending on the pressure of the gas to be treated. For example, pressures in the contact zone may vary from 1 atmosphere up to 150 or even 200 atmospheres. Pressures of from 1 atmosphere to about 100 atmospheres are preferred. In the regeneration or desorption zone or zones, pressures may be varied considerably, and will range from about one atmosphere absolute to about thirty or forty atmospheres, preferably from about one atomosphere to about thirty-five atmospheres.

Preferably, if the iron chelate of nitrilotriacetic acid is used, pH in the process of the invention will range from about 6 to about 8.0, and the molar ratio of the nitrilotriacetic acid to the iron is from about 1.0 to 1.4. The procedure is preferably conducted continuously.

As indicated, the $H_2S$, when contacted, is quickly converted by the polyvalent metal ions, polyvalent metal chelate, etc., to elemental sulfur. The amount of polyvalent metal compound, polyvalent metal chelate, or mixtures thereof, circulated is an effective amount, i.e., an amount sufficient to convert all or substantially all of the $H_2S$ in the gas stream, and will generally be on the order of at least 2 mol per mol of $H_2S$. Ratios of from about 2 mol to about 15 mols of polyvalent metal compound or chelate per mol of $H_2S$ may be used, with ratios of from about 2.5 mols per mol to about 8 mols of polyvalent metal compound or chelate per mol of $H_2S$ being preferred. The manner of preparing the aqueous solution or admixture is a matter of choice. The polyvalent metal ion or polyvalent metal chelate solution will generally be supplied as an aqueous solution having a concentration of from about 0.1 molar to about 2 molar.

While it is desirable to recover sulfur by mechanical means, in some instances it can be desirable to add, preferably less than the usual amount of, conventional chemicals known in the art to aid in sulfur recovery, including agglomerating agents and higher alkanols. Higher alkanols are compounds having the formula $C_nH_{2n+1}OH$, in which n is a whole number from 4 through 18, and mixtures thereof, may be used in extracting or removing the sulfur form the aqueous admixture or slurry. Useful compounds are t-butanol, n-pentanol, n-octanol, n-decanol, n-undecanol, n-dodecanol, and mixtures thereof. Preferably, the compounds employed are those wherein n is a whole number from 8 through 12, and mixtures thereof. The compound or compounds are supplied in an amount sufficient to remove at least the bulk of the sulfur from the slurry or admixture and form a separate phase comprising sulfur and the compound or mixture of compounds. Because the amount of the compound, or mixture of compounds, required is dependent on the amount of sulfur produced, which is, in turn, dependent on the concentration of $H_2S$ in the gas stream treated, precise amounts of the compounds cannot be given. Those skilled in the art may adjust the amount, as required. In general, the amount will range form about a few ppm to about 0.1 percent (by volume, based on polyvalent metal chelate solution in contact therewith), with an amount of 15 ppm to about 100 ppm by volume being preferred.

Any conventional wetting agent can be used. These include nonionic as well as cationic and anionic agents, such as those prepared by treating a higher alcohol or carboxyic acid or phenolic compound with ethylene oxide or the like, or soaps, sodium or ammonium alkyl or alkyl-aryl sulfates and sulfonates, quaternary amine halides and the like which are generally known in the art as in U.S. Pat. Nos. 3,907,422 and 4,374,104.

In the event of chemical degradation and loss of chelating agent such as aminopolycarboxylic acid, additional replacement chelating agent can be added or process conditions adjusted in any appropriate manner known in the art. British Pat. No. 999,800 discloses control of the regeneration of the catalyst solution to avoid over-oxidation of the iron chelate. U. S. Pat. No. 4,189,462 discloses that restricting the molar ratio of EDTA to iron is an important consideration in avoiding breakdown of the chelate molecule. U.S. Pat. No. 4,330,4789 discloses the use of specific types of aliphatic polycarboxylic acid chelating agents that are more resistant to oxidation. U.S. Pat. No. 3,622,273 discloses the addition of selected buffering agents to maintain the pH at a relatively high level at which the chelated iron complex is said to be more stable. U.S. Pat. No. 4,278,646 discloses the addition of selected amine salt stabilizers to achieve chelate stability at low pH levels. U.S. Pat. Nos. 4,382,818; 4,388,293; and 4,400,368 disclose the addition of various sulfur-containing and nitrogen-containing compounds as stabilizers to reduce the rate of chelate degradation. U.S. Pat. No. 4,622,212 discloses degradation inhibitors selected from alkaline thiosulfates and dihydroxy alcohols of 2 or 3 carbon atoms.

BRIEF DESCRIPTION OF THE DRAWING

The FIGURE is a schematic representation of the removal of excess water in the regeneration and recovery of a redox solution used in a process to remove $H_2S$ from a gas stream.

DETAILED DESCRIPTION OF THE INVENTION

Figure 1:
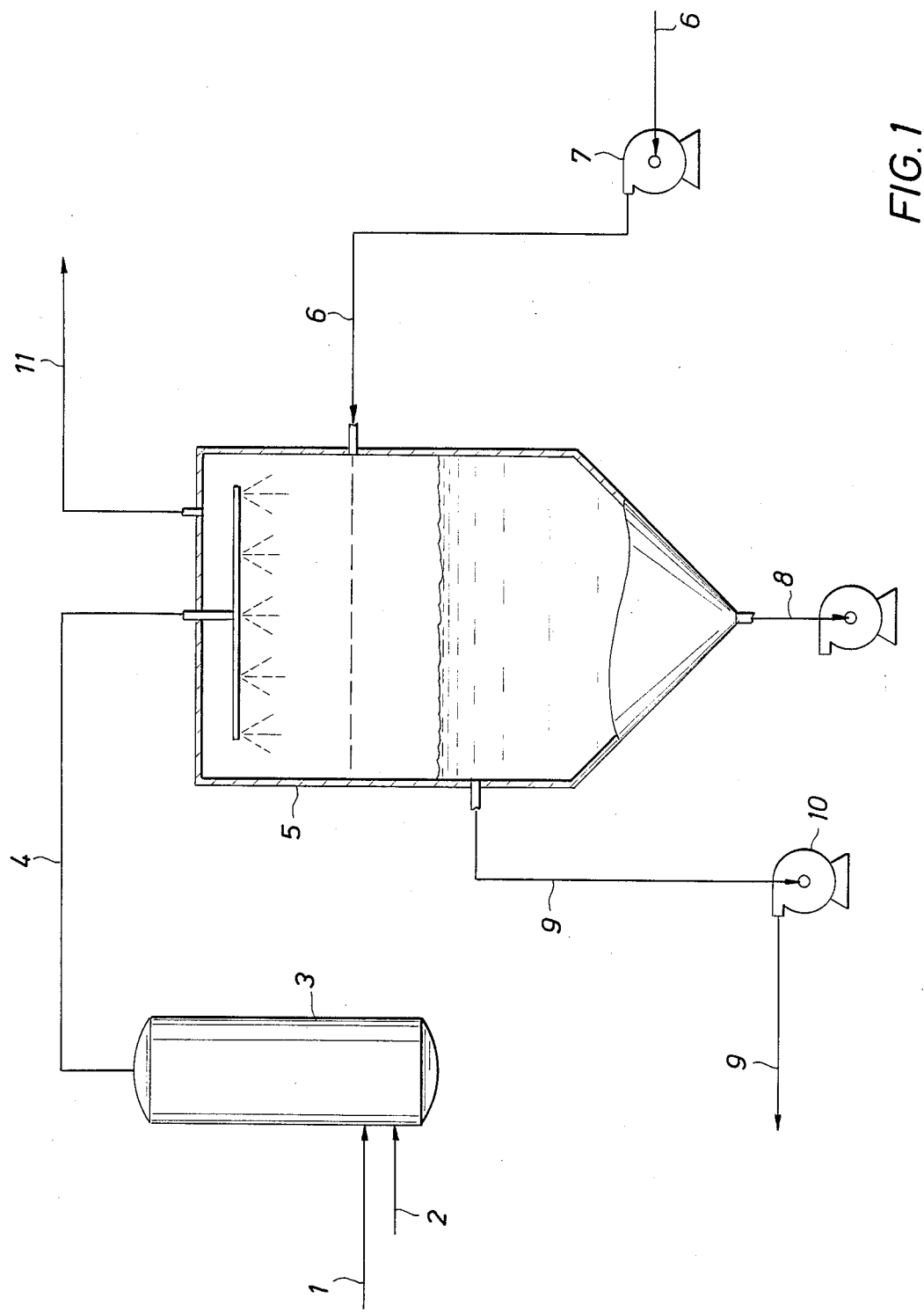

With reference to the FIGURE, a stream of partially spent aqueous redox solution, e.g., a chelate of N-(2-hydroxyethyl) ethylenediamine triacetic acid or chelate of nitrilotriacetic acid, having a concentration of from about 0.1 to 2 molar of polyvalent metal ion or chelate is injected into the bottom of a sparge vessel 3 via line 1 where it is contacted with a spray of oxygen containing gas which is injected as a spray via line 2. The admixture of redox solution and oxygen containing gas is under a full hydrostatic head in the vessel 3. The admixture of aqueous regenerated redox solution and spent oxygen containing gas are removed from vessel 3 and passed via line 4 to a surge/thickener vessel 5 where they are injected as a downwardly flowing spray. An inert gas, i.e., air, is injected as a cross flowing stream via line 6. The inert gas is raised to a sufficient pressure and flow rate by use of a low pressure blower 7 in line 6. The rate of flow and pressure of the inert gas injected via line 6 is sufficient to provide for the substantial saturation of the gas with the excess water impurities from the redox solution without the substantial undesired oxidation of the redox solution. Sulfur slurry is removed via line 8 for further treatment or processing, e.g., melting. Regenerated redox solution having a polyvalent metal ion or chelate concentration substantially the same as the original feed solution, i.e., about 0.1 to about 2 molar, is removed from the vessel 5 via line 9 and recycled via pump 10 to an absorption zone where it can be used to remove $H_2S$ from sour feed gas. Spent oxygen containing gas and air are removed overhead via line 11.

In an alternative embodiment (not shown), line 6 and the sprayers in the surge/thickener zone are replaced by the insertion of a static mixing device in line 4 into which mixer is injected the regenerated redox solution containing excess water and sufficient inert gas, e.g., air, to provide for the removal of the excess water by substantial saturation of the inert gas without the substantial undesirable oxidation of the regenerated redox solution.

While the invention has been illustrate with particular apparatus, those of skill in the art will appreciate that equivalent of analogous equipment can be employed. Where suitable, the use of segmented equipment operated in series, or the decision of one piece of equipment into multiple zones to improve efficiency or to overcome size constraints of the like is also within the invention. Parallel operation of equipment is within the scope of the invention.

What is claimed is:

1. A process for the selective removal of hydrogen sulfide from a gas stream which comprises (a) treating the gas stream with an aqueous polyvalent metal ion or polyvalent metal chelate redox solution containing a catalytically effective amount of polyvalent metal ion or chelate, and optionally containing a ligand degradation inhibitor; (b) recovering a sweetened gas stream; (c) removing sulfur from the solution; (d) regenerating the solution with an excess of an oxygen containing gas under oxidizing conditions in a regeneration zone until substantially all of the polyvalent metal is in its higher valence state; (e) in a separate zone from the regeneration, contacting the regenerated redox solution containing water in excess of that required to maintain a catalytically effective concentration of polyvalent metal ion or chelate in solution, with an inert gas in a manner to provide for the substantial saturation of the inert gas with excess water from te regenerated redox solution without substantial undesirable contamination of or oxidation of the metal or ligand in the regenerated redox solution; and (f) recycling the regenerated redox solution having a polyvalent metal ion or chelate concentration substantially the same as the feed soluton to step (a).

2. A process according to claim 1 wherein the solution is a polyvalent metal chelate solution and the inert gas is air.

3. A process according to claim 2 wherein the chelate solution is a Fe(III) chelate.

4. A process according to claim 3 wherein the chelate is the Fe(III) chelate of N-(2-hydroxyehtyl)ethylenediamine triacetic acid.

5. A process according to claim 3 wherein the chelate is the Fe(III) chelate of nitrilotriacetic acid.

6. A process according to claim 1 wherein the contacting in step (e) takes place in a static mixing device and at a rate and pressure to provide for the substantial saturation of the inert gas with the excess water present in the regenerated redox solution.

7. A process according to claim 1 wherein the contacting in step (e) takes place by passing the admixture from step (d), optionally in the presence of an agglomerating agent or alcohol, downwardly as a spray in a zone in which it is contacted with an inert gas injected at a point above the liquid level of the regenerated redox solution in the zone and at a rate and presure to provide for the substantial saturation of the inert gas with the excess water present in the regenerated redox solution.

8. A process for the removal of excess water from a regenerated aqueous polyvalent metal ion or polyvalent metal chelate redox solution regenerated under oxidizing conditions in a regeneration zone which comprises in a separate one from the regeneration contacting a regenerated aqueous solution of polyvalent metal ion or polyvalent metal chelate solution, regenerated under oxidizing conditions in a regeneration zone containing water in excess of that required to maintain a catalytically effective concentratiohn polyvalent metal ion or chelate in the solution, and optionally containing a degradation inhibitor, with an inert gas in a manner to provide for the substantial saturation of the inert gas with the excess water in the regenerated redox solution without substantial undesirable contamination of or oxidation of the metal or ligand in the regenerated redox solution.

9. A process according to claim 8 wherein the solution is a polyvalent metal chelate solution and the inert gas is air.

10. A process according to claim 9 wherein the chelate solution is a Fe(III) chelate.

11. A process according to claim 8 wherein the chelate is the Fe(III) chelate of N-(2-hydroxyethyl)ethylenediamine triacetic acid.

12. A process according to claim 10 wherein the chelate is the Fe(III) chelate of nitrilotriacetic acid.

13. A process according to claim 8 wherein the contacting (e) takes place in a static mixing device and at a rate and pressure to provide for the substantial saturation of the inert gas with the excess water present in the regenerated redox solution.

14. A process according to claim 8 wherein the contacting takes place by passing the admixture of regenerated redox solution containing excess water optionally in the presence of an agglomerating agent or alcohol, downwardly as a spray in a zone in which it is contacted with an inert gas injected at a point above the liquid level of the regenerated redox solution in the zone and at a rate and pressure to provide for the substantial saturation of the inert gas with the excess water present in the regenerated redox solution.

15. A process for the selective removal of hydrogen sulfide from a gas stream which comprises (a) treating the gas stream with an aqueous polyvalent metal ion or polyvalent metal chelate redox solution containing a catalytically effective amount of polyvalent metal ion or chelate, and optionally containing a ligand degradation inhibitor; (b) recovering a sweetened gas stream; (c) regenerating the solution with an excess of an oxygen containing gas under oxidizing conditions in a regeneration zone until substantially all of the polyvalent metal is in its higher valence state; (d) in a separate zone from the regeneration, contacting the regenerated redox solution containing water in excess of that required to maintain a catalytically effective concentration of polyvalent metal ion or chelate in solution, with an inert gas in a manner to provide for substantial saturation of the inert gas with excess water from the regenerated redox solution without substantial undesired contamination of or oxidation of the metal or ligand in the regenerated redox solution; (e) removing sulfur from the regenerated redox solution; and (f) recycling the regenerated redox solution having a polyvalent metal ion or chelate concentration substantially the same as the feed solution to step (a).

16. A process according to claim 15 wherein the solution is a polyvalent metal Fe(III) chelate solution and the inert gas is air.

17. A process according to claim 16 wherein the chelate is the Fe(III) chelate of N-(2-hdyroxyethyl)ethylenediamine triacetic acid.

18. A process according to claim 16 wherein the chelate is the Fe(III) chelate of nitrilotriacetic acid.

19. A process according to claim 15 wherein the contacting in step (d) takes place in a static mixing device and at a rate and pressure to provide for the substantial saturation of the inert gas with the excess water present in the regenerated redox solution.

20. A process according to claim 15 wherein the contacting in step (d) takes place by passing the admixture from step (c), optionally in the presence of an agglomerating agent or alcohol, downwardly as a spray in a zone in which it is contacted with an inert gas injected at a point above the liquid level of the regenerated redox solution in the zone and at a rate and pressure to provide for the substantial saturation of the inert gas with the excess water present in the regenerated redox solution.

* * * * *